United States Patent Office 2,920,043
Patented Jan. 5, 1960

2,920,043
CATION MODIFIED CLAY AS A THICKENER FOR HYDROCARBON LUBRICATING OIL

Robert R. Burns, Naperville, and Edwin H. Goldenburg, Park Forest, Ill., assignors to Nalco Chemical Company, Chicago, Ill., a corporation of Delaware No Drawing. Application June 7, 1957
Serial No. 664,169

6 Claims. (Cl. 252—49.7)

The present invention relates to lubricating greases prepared from aromatic hydrocarbon oils and compositions useful in preparing such greases.

Organophilic modified base exchange clays are now widely accepted as excellent thickeners for many lubricating oils. These modified clays are described in detail in Hauser, U.S. Patent 2,531,427.

These modified clays have the ability to swell in organic liquids and are completely hydrophobic. According to Hauser, the clays used as base materials are those having base exchange capacities of at least 15 and preferably 60–100. Thus, such clays as the alkali metal montmorillonites (bentonites) such as Wyoming bentonite, saponite, and also nonotronite, attapulgite, illite, zeolites and fuller's earths are well suited for reaction with certain onium compounds to produce a variety of modified clay products. The onium compounds used to treat the base exchange clays may be drawn from a wide variety of tri- and pentavalent compounds. They usually have a molecular area of 70 square angstrom units or more. For purposes of commercial expediency, it is common to treat the base exchange clays with fatty substituted amines or quaternary ammonium salts. A typical product, manufactured commercially by the National Lead Company as "Bentone 34," is chemically dimethyldioctadecyl ammonium bentonite.

The use of the aforementioned organic modified clays in lubricants was first described by Jordan in U.S. Patent 2,531,440. This patent clearly demonstrates the use of onium modified clays as thickeners for a variety of lubricating vehicles.

Commercially, large quantities of lubricating greases are made from such materials as "Bentone 34" and various lubricating oil stocks. As the art progressed it was discovered that many of the organic modified clays were not able to thicken certain types of hydrocarbon lubricating oils unless impractical amounts were used. In some cases they formed products of hazy appearance which were not acceptable to the standards set by the trade.

The particular oils which are not gelled by fatty amines nor quaternary ammonium salt-treated clays are those predominantly composed of aromatic constituents. While many paraffinic oils are available for grease production using organic modified clays, there are large quantities of aromatic lubricating oils produced which must be formulated into greases with such conventional thickeners as heavy metal soaps due to the poor results obtained with the organic modified clays.

It would be beneficial if a new species of organic modified clays were available which would act as thickeners for aromatic lubricating oils at low dosages. It would also be advantageous if such modified clays could be prepared from cheap and readily available materials.

An object of the invention, therefore, becomes the furnishing of new organic modified clays which may be prepared from inexpensive, available materials.

Another object is to provide lubricating greases formulated from these new organic modified clays and aromatic lubricating oils. Other objects will be described in a later part of this specification.

In accordance with this invention it has been found that excellent greases can be prepared from aromatic lubricating oils using as a thickener or gelling agent a special cation modified clay which originally exhibited a base exchange capacity of at least 25. These clays are modified by exchanging the inorganic cation with a specific oleophilic, 1-, 2-substituted imidazolinium salt which contains at least one aromatic group. The clay used as a starting material may be selected from any of those mentioned by Hauser in his U.S. Patent 2,531,427, the disclosure of which is incorporated herein by reference. A preferred type of clay is bentonite, particularly Wyoming bentonite.

Aromatic lubricating oils are produced from a wide variety of crude stocks and may be either solvent extracted or distilled. Since analysis of the various aromatic components in such oils is difficult it is convenient to define and limit aromatic lubricating oils by reference to their aniline points. As a reference point, paraffinic oils will usually have an aniline point greater than 110° C., whereas highly aromatic oils have aniline points below 85° C. Oils falling within this range, viz., 85° C.– 110° C., are usually composed of blends of aromatic and paraffinic constituents. The organic modified clays of the invention work exceedingly well in any lubricating oil having an aniline point not greater than 110° C.

The specific 1-, 2-substituted imidazolinium salts that have shown effectiveness in the practice of the invention may be generally defined by the structure:

I. 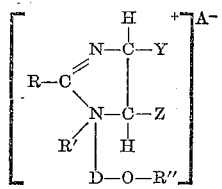

In this formula D represents a divalent organic radical containing less than 25 carbon atoms which may be composed of such elements as C, H, and O. Y and Z are hydrogen or lower alkyl groups containing not more than 6 carbon atoms. A is an anion, either organic or inorganic, and may be selected from a large number of anionic substituents. R is an organic radical such as aryl, alkaryl, alkyl, or aralkyl, although it will most preferably be a higher aliphatic group. R' is an organic radical such as alkyl, alkaryl, or aralkyl. R" is preferably hydrogen but may be a substituted carbonyl radical of the formula

where E may be alkyl, aryl, alkaryl, or aralkyl. To be useful in the invention the compounds thus embraced in this formula must be soluble or dispersible in an aromatic hydrocarbon oil of the types described, hence they are named as oleophilic, and at least one occurrence of R, R' and R" must contain an aromatic nucleus.

In a preferred embodiment the 1-, 2-substituted imidazolinium salts have the formula:

II. 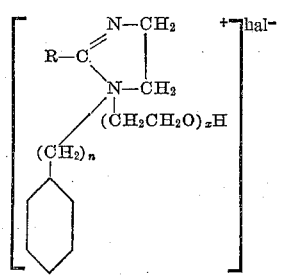

where R is an alkyl group, most desirably a saturated alkyl group, of from 9 to 32 carbon atoms in chain length. The subscripts, $n$ and $x$ are integers having values from 1 to 6 and 1 to 3, respectively. The abbreviation, hal, represents the halide anion (e.g., chloride or bromide), most suitably chloride.

A typical composition under Formula II above has the formula:

III. 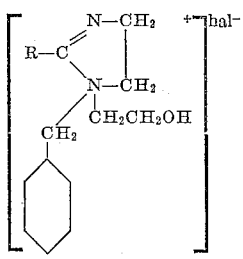

where R is the residue of a hydrogenated naturally occurring oil such as tallow or marine oils. Hal here also represents a halide anion such as chloride.

The 1-, 2-substituted imidazolinium salts are conveniently prepared from the hydroxy alkyl imidazolines which are synthesized from a carboxylic acid and a hydroxyalkyl alkylene polyamine. Imidazolines of this type and a convenient mode for their preparation are disclosed in Wilson, U.S. Patent 2,267,965, the disclosure of which is incorporated herein by reference. A more complete treatment of the 1-, 2-substituted imidazolines appears in Chemical Reviews, vol. 54, No. 4, August (1954), under the title "The Chemistry of the 2-Imidazolines and Imidazolidines" by R. J. Ferm and J. L. Riebsomer. The imidazolines are converted to the corresponding imidazolinium salt by alkylation with a suitable organic alkylating agent.

For purposes of illustration the following typical 1-, 2-substituted imidazolinium salts are presented. Since the nomenclature of these chemicals is complex and often substituents are derived from mixed materials such as oils and fats, the class name is sometimes used where such is deemed appropriate.

COMPOSITION I

R=hydrogenated tallow.

COMPOSITION II

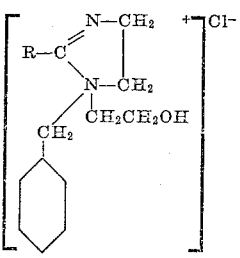

R=hydrogenated fish oil having an acid number of 178–185 and a saponification value of 179–186.

COMPOSITION III

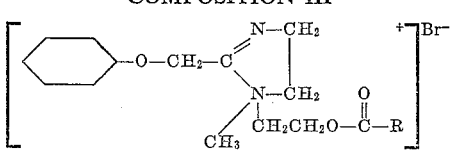

R=$C_{17}$ saturated radical.

COMPOSITION IV

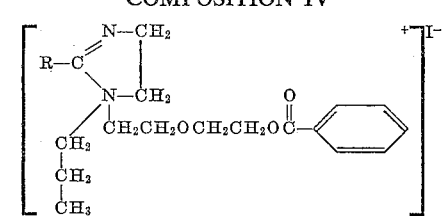

R=radical from oleic acid.

COMPOSITION V

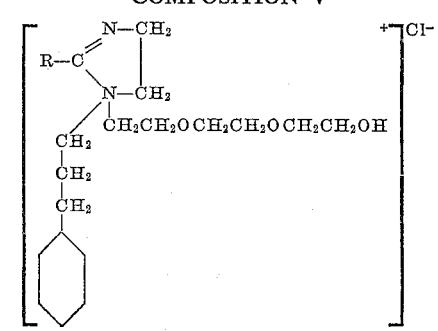

R=hydrogenated tallow.

COMPOSITION VI

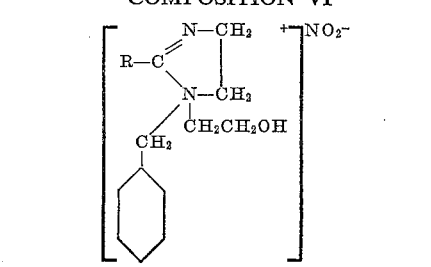

R=hydrogenated tallow.

COMPOSITION VII

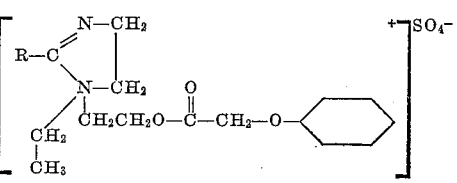

R=hydrogenated sardine oil.

By way of further explanation the starting imidazolines in Compositions I and II were prepared according to Wilson with the imidazoline thus produced being alkylated with benzyl chloride.

The starting imidazoline in Composition III was prepared from phenoxy acetic acid and amino ethylethanolamine which was then esterified with an octadencanoic acid. This esterified imidazoline was then alkylated with methylbromide.

Composition IV used oleic acid and aminoethylethanolamine to form the imidazoline which was then reacted with one mol of ethylene oxide and subsequently esterified with benzoic acid. Alkylation was performed using propylbromide.

Composition V used the starting imidazoline of Composition I which was reacted with 2 mols of ethylene oxide and then alkylated with 3-phenylpropylchloride.

Composition VI was prepared by passing an alcoholic solution of Composition I through a strong base anion exchanger in the nitrite form with the subsequent removal of the alcohol by evaporation.

Composition VII used an imidazoline of hydrogenated sardine oil and amino ethylethanolamine in its preparation which was then esterified with phenoxy acetic acid and subsequently alkylated with ethyl sulfate.

The amount of 1-, 2-substituted imidazolinium salt needed to form the organic modified clays may be varied from as little as 50 milliequivalents to 100 milliequivalents per 100 grams of clay. Excellent products are produced using from 85 to 95 milliequivalents. While any of the techniques described by Hauser in U.S. Patent 2,531,427 may be used in making the organic modified clays, the following method, set forth in Example I, has given good results.

*Example I*

100 grams of centrifuged Wyoming bentonite were suspended in 2 liters of water by means of a Lightning mixer. The temperature was raised to 60–70° C. and 95 milliequivalents, calculated on a pure basis, of the imidazolinium salt were slowly added. The imidazolinium salt was either dissolved in an equal weight of isopropanol or melted before being added. The mixture was stirred for 30 minutes, the above temperature being maintained, and then filtered on a Buchner funnel. The filter cake was re-suspended in 2000 ml. of water, stirred for 30 minutes and filtered. The filter cake was dried overnight at 50° C. and pulverized through a 0.02 inch screen on a Raymond laboratory mill.

Using the above method Wyoming bentonite was treated with the Compositions I through VII.

*Example II*

Lubricating greases were prepared from two different oils using the following general preparation method:

66 grams of the organic modified clay was blended by means of a Lightning mixer into 330 grams of the oil. 33 grams of acetone was added and, when a stiff paste had formed, 670 grams of the oil was poured in. Mixing was continued until the solid was evenly dispersed—about 30 minutes. The mixture was allowed to stand for 30 minutes and then passed through a Tri-Homo disperser with a stator to rotor clearance adjusted to 0.001 inch. The consistency (penetration) of the unworked greases was then determined according to the ASTM standard method D 217–48.

The above test method used 6% by weight of the modified clay in the oil. In actual practice the quantity may be varied from 4% to 12% by weight depending on the particular clay, oil stock, and type of grease desired. Usually, however, 6% by weight forms an excellent all-purpose lubricant.

The lubricating oils used in the tests consisted of one paraffinic oil (aniline number=240° C.) and an aromatic oil (aniline number=82.1° C.). Greases were prepared from the paraffin oil and the modified clays of Example I. The greases were in the ASTM penetrations range of 260–291. Using "Bentone–34" a grease was prepared from the same oil having a penetration of 291. It was observed, however, that the greases prepared from the 1-, 2-substituted imidazolinium salts were hazy in appearance, whereas the greases prepared from "Bentone–34" were translucent without any evidence of haze being apparent.

Greases were prepared from the bentonites modified with Compositions I and II and the aromatic oil. They were clear in appearance and had an ASTM penetration of 261. "Bentone–34" when formulated into the oil failed to gel the oil. When the dosage of "Bentone–34" was increased to 10%, the resultant grease had a penetration of 390. In both cases the "Bentone–34" greases were not satisfactory from an appearance standpoint since they were extremely hazy, which indicated incomplete gelling.

*Example III*

The grease prepared from the bentonite modified with Composition I and the aromatic oil was used to lubricate a high speed bearing in a chemical briquette manufacturing machine. Excellent lubrication with no sign of wear or bleeding was evidenced in three weeks of intermittent operation.

The formulation of greases using organic modified clays is well known and is described in detail in the volume, "Manufacture and Application of Lubricating Greases," by C. J. Boner, Reinhold (1954). Any of the methods or applications shown in this work are susceptible for adaptation to this invention.

In the specification and claims the quaternary nitrogen is shown to be on the 1-nitrogen atom of the imidazoline ring. It is to be understood that the 3-nitrogen may be pentavalent as a result of alkylation, and if this is the case, then such is meant to be included herein.

The invention is hereby claimed as follows:

1. A cation modified clay, originally exhibiting a base exchange capacity of at least 25, in which the exchangeable inorganic cation has been exchanged for an oleophilic, 1-, 2-substituted imidazolinium salt of the formula:

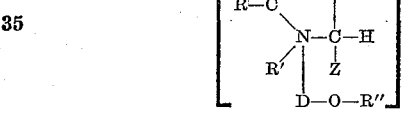

in which D represents a divalent organic radical containing less than 25 carbon atoms, composed of elements from the group consisting of C, H, and O; Y and Z are from the group consisting of hydrogen and lower alkyl groups containing not more than 6 carbon atoms; A is an anion; R is a member of the class consisting of alkyl, aryl, alkaryl and aralkyl; R' is a member of the class consisting of alkyl, alkaryl, and aralkyl and R" is a member of the class consisting of H and

in which E is a member of the class consisting of alkyl, aryl, alkaryl and aralkyl; with the proviso that at least one occurrence of R, R', and R" contain an aromatic nucleus.

2. A cation modified bentonite in which the exchangeable inorganic cation has been exchanged for a 1-, 2-substituted imidazolinium salt of the formula:

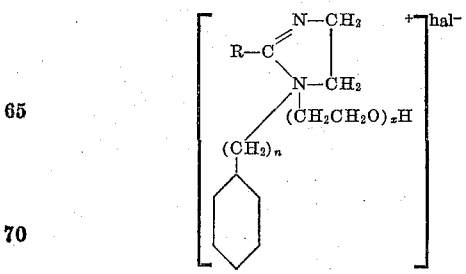

in which R is an alkyl group of from 9 to 32 carbon atoms in chain length, n is an integer from 1 to 6, x is a number from 1 to 3, and hal is halide.

3. A cation modified bentonite in which the exchangeable inorganic cation has been exchanged for a 1-, 2- substituted imidazolinium salt of the formula:

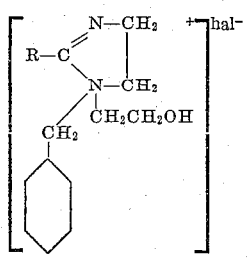

in which R is the residue of a hydrogenated oil from the group consisting of hydrogenated tallow and hydrogenated marine oils, and hal is halide.

4. A lubricating grease comprising a major portion of a hydrocarbon lubricating oil having an aniline point not greater than 110° C. and a minor gel forming amount of the cation modified clay of claim 1.

5. A lubricating grease comprising a major portion of a hydrocarbon lubricating oil having an aniline point not greater than 110° C. and a minor gel forming amount of the cation modified bentonite of claim 2.

6. A lubricating grease comprising a major portion of a hydrocarbon lubricating oil having an aniline point not greater than 110° C. and a minor gel forming amount of the cation modified bentonite of claim 3.

References Cited in the file of this patent

UNITED STATES PATENTS

| | | |
|---|---|---|
| 2,531,427 | Hauser | Nov. 28, 1950 |
| 2,531,440 | Jordan | Nov. 28, 1950 |
| 2,662,056 | McCarthy | Dec. 8, 1953 |